United States Patent [19]

Lin

[11] Patent Number: 5,313,926
[45] Date of Patent: May 24, 1994

[54] SUPPLEMENTAL EMISSION CONTROL DEVICE FOR A GASOLINE ENGINE

[76] Inventor: Fu-Kuo Lin, 2F, No. 128, Liow Tang Street, Sanchorng, Taipei, Taiwan

[21] Appl. No.: 57,815
[22] Filed: May 7, 1993
[51] Int. Cl.⁵ ............................................ F02M 23/00
[52] U.S. Cl. .................................................. 123/587
[58] Field of Search ................ 123/572, 573, 574, 587

[56] References Cited

U.S. PATENT DOCUMENTS

| | | | |
|---|---|---|---|
| 2,876,757 | 3/1959 | Korienek | 123/587 |
| 3,463,132 | 8/1969 | Krieck | 123/587 |
| 4,112,892 | 9/1978 | Lindberg | 123/572 |
| 4,370,971 | 2/1983 | Bush | 123/587 |
| 4,483,309 | 11/1984 | Normon et al. | 123/573 |

*Primary Examiner*—Noah P. Kamen
*Attorney, Agent, or Firm*—Morton J. Rosenberg; David I. Klein

[57] ABSTRACT

A supplemental emission control device for a gasoline engine utilizes the vacuum suction of the venturi of the carburetor or the air intake manifold to draw ambient air through a filter sponge and a piston control chamber into the combustion chamber of a gasoline engine to mix with the fuel therein to form a uniform fuel mixture for a complete and efficient combustion. A regulating screw is provided to regulate the flow rate of the ambient air into the combustion chamber.

1 Claim, 2 Drawing Sheets

SUPPLEMENTAL EMISSION CONTROL DEVICE FOR A GASOLINE ENGINE

BACKGROUND OF THE INVENTION

1. Field of the Invention

The present invention relates to a supplemental emission control device for a gasoline engine. In particular, this invention pertains to a supplemental emission control device which greatly improves the combustion efficiency of a gasoline engine and controls the discharge of exhaust gas.

2. Prior Art

Various gasoline engine exhaust gas control devices are known and widely used for improving the combustion efficiency of a gasoline engine of a motorcycle or an automobile and for reducing the pollution in the exhaust gas. These prior art devices include exhaust gas recirculation systems, positive crank case ventilating systems, evaporative emission control systems, and catalytic converters, etc. The present invention uses the vacuum from the operation of the gasoline engine to draw fresh or ambient air into air intake manifold and the carburetor for mixing with a fuel mixture before the fuel mixture enters the combustion chamber, thereby improving the combustion efficiency and reducing the hydrocarbons in the exhaust gas.

SUMMARY OF THE INVENTION

The present invention provides a supplemental emission control device for a gasoline engine which greatly improves the combustion performance of the gasoline engine to reduce the consumption of fuel. The present invention is installed in the positive crank case ventilating system and comprises a piston which draws a current of ambient air into the air intake manifold and the carburetor for mixing with the fuel mixture, and a filter sponge to remove particles from the intake current of ambient air before it is mixed with the fuel mixture for a complete and efficient combustion. The piston and the filter sponge are respectively disposed in two separate chambers, which are connected through a first air opening. Thus, the assembly of the present invention is easy to assemble and to maintain. The present invention does not change or affect the original vacuum route direction of the gasoline engine.

DESCRIPTION OF THE PREFERRED EMBODIMENT

Figure 1:
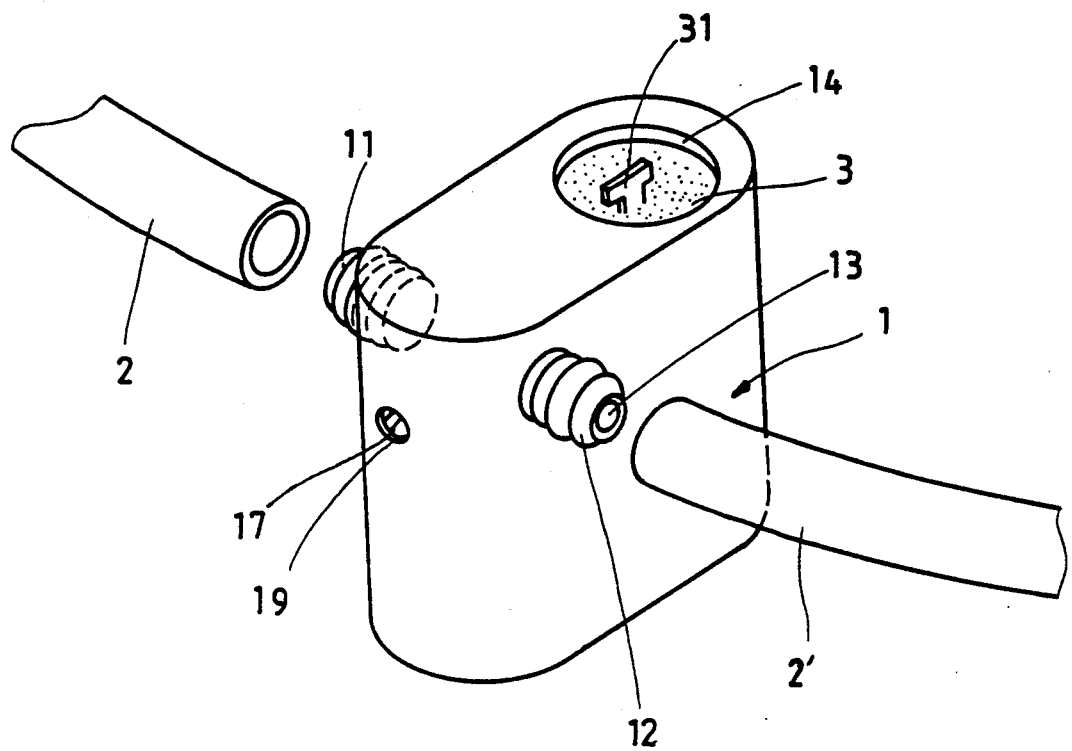
FIG. 1 is a perspective view of a supplemental emission control device for a gasoline engine device in accordance with the present invention.
Figure 2A:
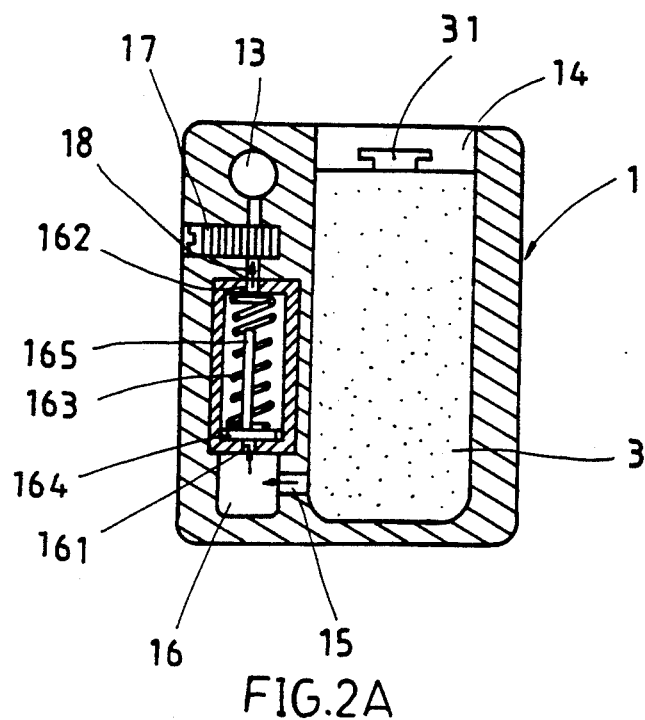
FIG. 2A is a longitudinal sectional view of a supplemental emission control device for a gasoline engine showing the lower air passage of the control chamber sealed in accordance with the present invention.
Figure 2B:
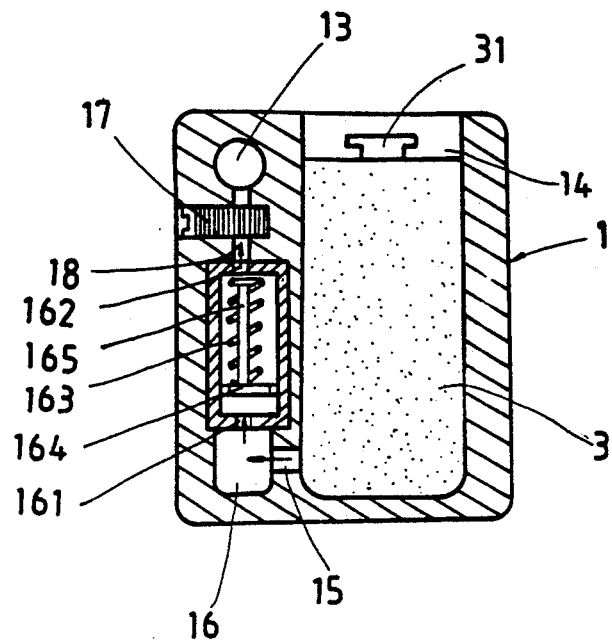
FIG. 2B is similar to FIG. 2A, but shows the lower air passage of the control chamber opened by the intake current of ambient air.

Referring to FIGS. 1-2B, the supplemental emission control device for a gasoline engine of the present invention comprises a housing 1 having first and second hose connectors 11 and 12, respectively attached to opposed side walls of the housing 1. The hose connections 11 and 12 are attached to a pair of air hoses 2 and 2', respectively. A transverse through opening 13 is formed for connecting the hose connectors 11 and 12, respectively, in fluid communication with each other. An air intake chamber 14 and a control chamber is formed in housing 1. The control chamber 16 is in fluid communication with the intake chamber 14 via a first air opening 15 formed in a sidewall of the air intake chamber 14 and is in further fluid communication with lower air passage 161 formed in the bottom wall of the control chamber 16. The control chamber 16 is in fluid communication with the transverse through opening 13 via a second opening 18 and an upper air passage 162 formed in the top wall of the control chamber 16. An opening 19 is formed in housing 1 and in fluid communication with transverse through openings 13 and the control chamber 16 via the second opening 18. A sponge filter 3 is removably secured in the air intake chamber 14 for removing particles from the current of ambient air drawn into the air intake chamber 14. The upper end of the filter sponge 3 is coupled to a handle 31 for facilitating removal and replacement of the filter sponge 3 from the air intake chamber 14.

Figures 3, 4:
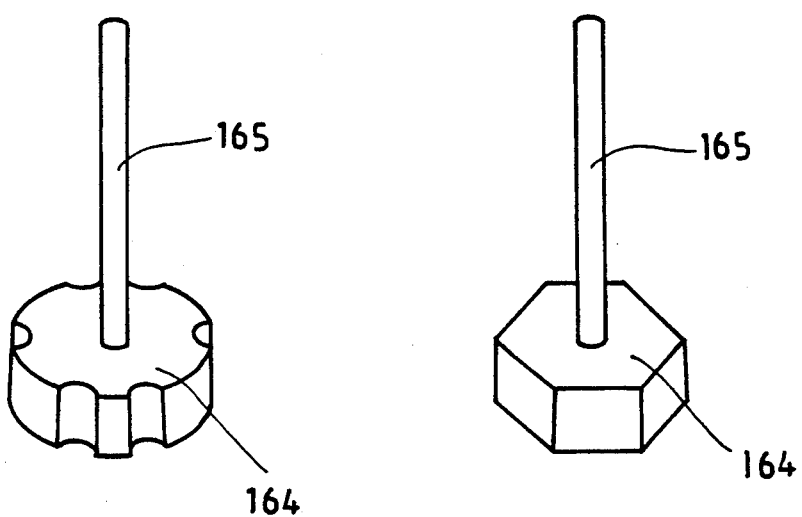
FIG. 3 is a perspective view of a piston in accordance with the present invention; and, FIG. 4 illustrates an alternative form of the piston.

The upper air passage 162 is in fluid communication with the transverse opening 13 via the second opening 18, and the lower air passage 161 is in fluid communication with air intake chamber 14 through the first opening 15. A piston 164 slidably disposed in the control chamber 16 is fastened to a piston rod 165. A spring 163 disposed about the piston rod 165 abuts the piston 164 and the top wall of the control chamber 16. The spring 163 biases the piston 164 in a downwardly direction, thereby causing piston 164 to seal the lower air passage 161. The piston 164 may have various shapes, as shown in FIGS. 3 and 4, and can be inverted in the control chamber 16 to seal or open the upper air passage 162.

An air flow regulating screw 17 is threaded into the opening 19 formed in the housing 1. The regulating screw 17 may be turned to regulate the flow rate of filtered ambient air through the second opening 18. During the operation of the gasoline engine, the vacuum suction of the venturi of the carburetor or the air intake manifold draws a current of air into the air intake chamber 14. The current of ambient air is filtered through the sponge filter 3 and drawn through the first opening 15 into the control chamber 16 to lift the piston 164, thereby unsealing the lower air passage 161. The current of ambient air is then passed through the upper air passage 162 and the second opening 18 into the transverse through opening 13 and through the air hoses 2 and 2'. The current of filtered ambient air flowing through the air hoses 2 and 2' passes into an air intake manifold and the carburetor, respectively, where it is mixed with fuel to form a uniform fuel mixture for a complete and efficient combustion.

As various possible embodiments might be made of the above invention without departing from the scope of the invention, it is to be understood that all matter herein described or shown in the accompanying Drawings is to be interpreted as illustrative and not in a limiting sense.

What is claimed is:

1. A supplemental emission control device for a gasoline engine comprising:
   a housing having first and second hose connectors affixed to opposed side walls thereof;

a pair of first and second air hoses having first ends attached to said first and second hose connectors, respectively, and second ends attached to an air intake manifold and a carburetor, respectively;

a transverse through opening formed in said housing for connecting said first and second hose connectors in fluid communication with each other;

an air intake chamber formed in said housing, said air intake chamber having an open upper end for passage therein of ambient air;

a control chamber formed in said housing, said control chamber in fluid communication with said air intake chamber and said transverse through opening;

valving means disposed in said control chamber for drawing said current of ambient air into said air intake chamber and said control chamber, said valving means having a piston slidably disposed in said control chamber and a piston rod extending upwardly from said piston;

biasing means for moving said piston in a downwardly directed displacement to seal a lower air passage formed in a bottom wall of said control chamber, said biasing means disposed about said piston rod within said control chamber;

air flow regulating means formed in said housing for controlling a volume of said ambient air flowing into said transverse through opening, said air flow regulating means including an opening formed in said housing in fluid communication with said control chamber and said transverse through opening, and a screw member threadably received by said bore; and, filtering means mounted in said intake chamber for removing contaminants in said air, said filtering means including a removable sponge filter and a handle member affixed to an upper end of said sponge filter for facilitating removal and replacement of said sponge filter from said air intake chamber.

* * * * *